SOLID STATE TIME SEQUENTIAL OPTICAL IMAGE TRANSDUCER UTILIZING FRAME TIME QUANTA COLLECTION

Filed Sept. 11, 1968 3 Sheets-Sheet 1

INVENTOR.
R. K. H. GEBEL
BY Harry A. Herbert Jr
ATTORNEY
James S. Shannon
AGENT

INVENTOR.
R. K. H. GEBEL
BY Harry A. Herbert Jr
ATTORNEY
James S. Shannon
AGENT

INVENTOR.
R. K. H. GEBEL
BY Harry A. Herbert Jr
ATTORNEY
James S. Shannon
AGENT

United States Patent Office 3,536,829
Patented Oct. 27, 1970

3,536,829

SOLID STATE TIME SEQUENTIAL OPTICAL IMAGE TRANSDUCER UTILIZING FRAME TIME QUANTA COLLECTION

Radames K. H. Gebel, Dayton, Ohio, assignor to the United States of America as represented by the Secretary of the Air Force Filed Sept. 11, 1968, Ser. No. 759,157
Int. Cl. H04n 3/14, 5/30
U.S. Cl. 178—7.1 8 Claims

ABSTRACT OF THE DISCLOSURE

An optical image transducer particularly for infrared guidance systems having an image receiving mosaic made up of discrete photoconductive elements arranged in lines and columns. Each line of elements is provided with two simultaneously triggered monostable multivibrators, one producing an energizing pulse equal in duration to the element scan interval and the other a delay pulse defining the line scan interval. The energizing pulse is applied simultaneously to all mosaic elements in the corresponding line, and the line elements are connected to a video output circuit through delay lines which successively increase in delay by the element scan interval. The trailing edge of the line interval pulse for each line is used to trigger the multivibrators for the next succeeding line, that of the pulse for the last line being use to trigger the multivibrators for the first line starting a new frame.

BACKGROUND OF THE INVENTION

The invention relates to image transducers and particularly to time sequential image transducers for use in the infrared region of the spectrum.

Previous infrared image transducers have employed a thin high resistance infrared sensitive photoconductive layer on which the infrared image is formed. To produce the time sequential signal this layer is scanned by an electron beam derived from a thermionic cathode. Because of the electron beam scanning all elements must be enclosed in an evacuated envelope. Further, various means have had to be devised to reduce the amount of heat from the thermionic cathode that reaches the photoconductor where it can not be distingushed from the desired infrared image and results in spurious components in the video signal produced.

SUMMARY OF THE INVENTION

The purpose of the invention is to provide an image transducer, particularly for infradred radiation but suitable also for visible radiation, which requires neither an evacuated envelope nor an electron beam for scanning so that the thermionic cathode with its above-mentioned spurious signal production is absent. A further purpose is to provide a simply constructed photoconductive mosaic particularly suited to the solid state scanning system described.

The photoconductive mosaic comprises discrete photoconductive elements arranged in lines and columns. The mosaic is constructed by drilling small holes in an insulating substrate at the intersections of the lines and columns. Recesses centered on the holes are provided on the image side of the substrate Wires are placed through the holes and locked in the recesses which are then filled with photoconductive material either by condensation from a vapor or by the insertion of a small photoconductive crystal held in place and connected to the wire by conductive paint used as an adhesive. The photoconductive elements in each line are connected together on the image side either by a conductive transparent strip overlay or by a line of conductive paint contacting their edges.

For scanning the mosaic, each line of elements is provided with two simultaneously triggered monostable multivibrators, one producing an energizing pulse equal in duration to the element scan interval and the other a delay pulse defining the line scan interval. The energizing pulse is applied simultaneously to all mosaic elements in the corresponding line, and the line elements are connected to a video output circuit through delay lines which successively increase in delay by the element scan interval. The trailing edge of the line interval pulse for each line is used to trigger the multivibrators for the next succeeding line, that of the pulse for the last line being used to trigger the multivibrators for the first line starting a new frame. The elements in each column are connected to the delay line for that column through isolating diodes so that only one set of delay lines is required. The delay lines are also connected to the video output through isolating diodes.

DESCRIPTION OF THE PREFERRED EMBODIMENT

Figure 1:
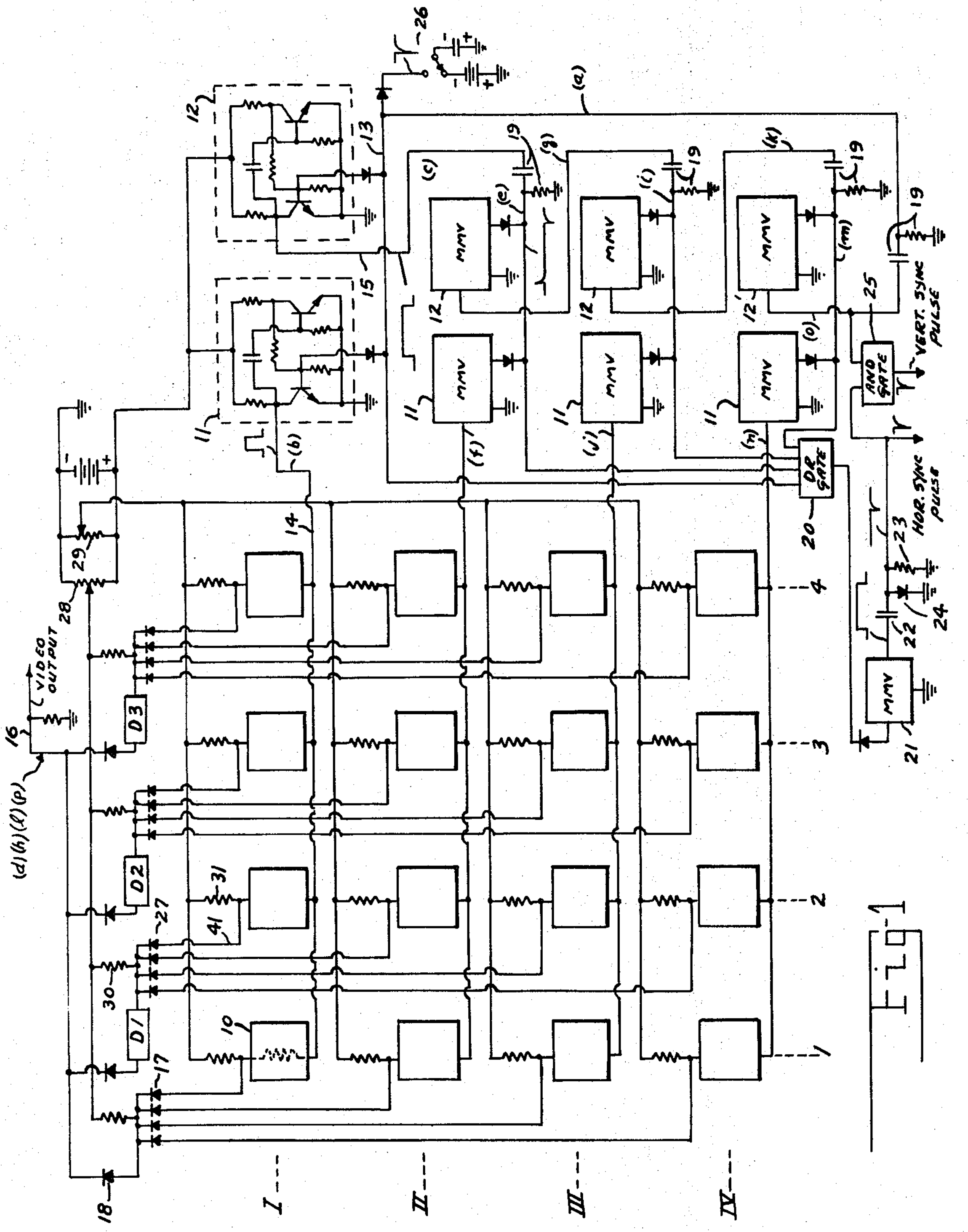
FIG. 1 is a schematic diagram of an image transducer in accordance with the invention.
Figure 2:
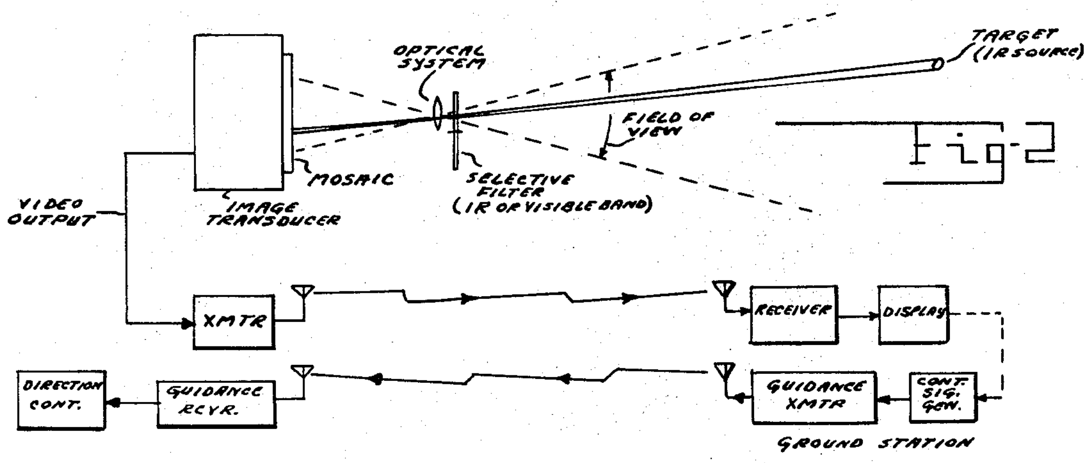
FIG. 2 illustrates a use of the transducer of FIG. 1.

The image transducer shown schematically in FIG. 1 has a mosaic composed of sixteen photoconductive elements arranged in four lines I–IV and four columns 1–4. Although a relatively small number of elements are used such a transducer has practical application in a guidance system, such as shown in FIG. 2, for guiding a missile toward an infrared emitting target from a ground station either manually or automatically. The video signal produced by the image transducer is displayed on a CRT indicator at the ground station where controls are effected to keep the target in the center of the raster or equally on the four central photosensors of the mosaic.

All elements of the mosaic are alike so that a description of one element 10 will suffice. This element is made of a photoconductive material such as CdS or a mixture of CdS and PbS, for example. As well understood, the absorption of quantum energy by the electrons of such a semiconductor from radiation falling upon it raises the electrons from the valence band to the conduction band and lowers the electrical resistance of the semiconductor. Within an interval equal to the current carrier lifetime of the particular semiconductor, the total number of carriers produced and the resulting reduction of resistance is a direct function of the number of photons or quanta absorbed. Therefore, the element 10 is in effect a resistance the conductance of which depends upon the intensity of radiation falling on it, i.e. the number of photons per unit of time, and within limits the length of time during which this radiation is received.

Figure 3:
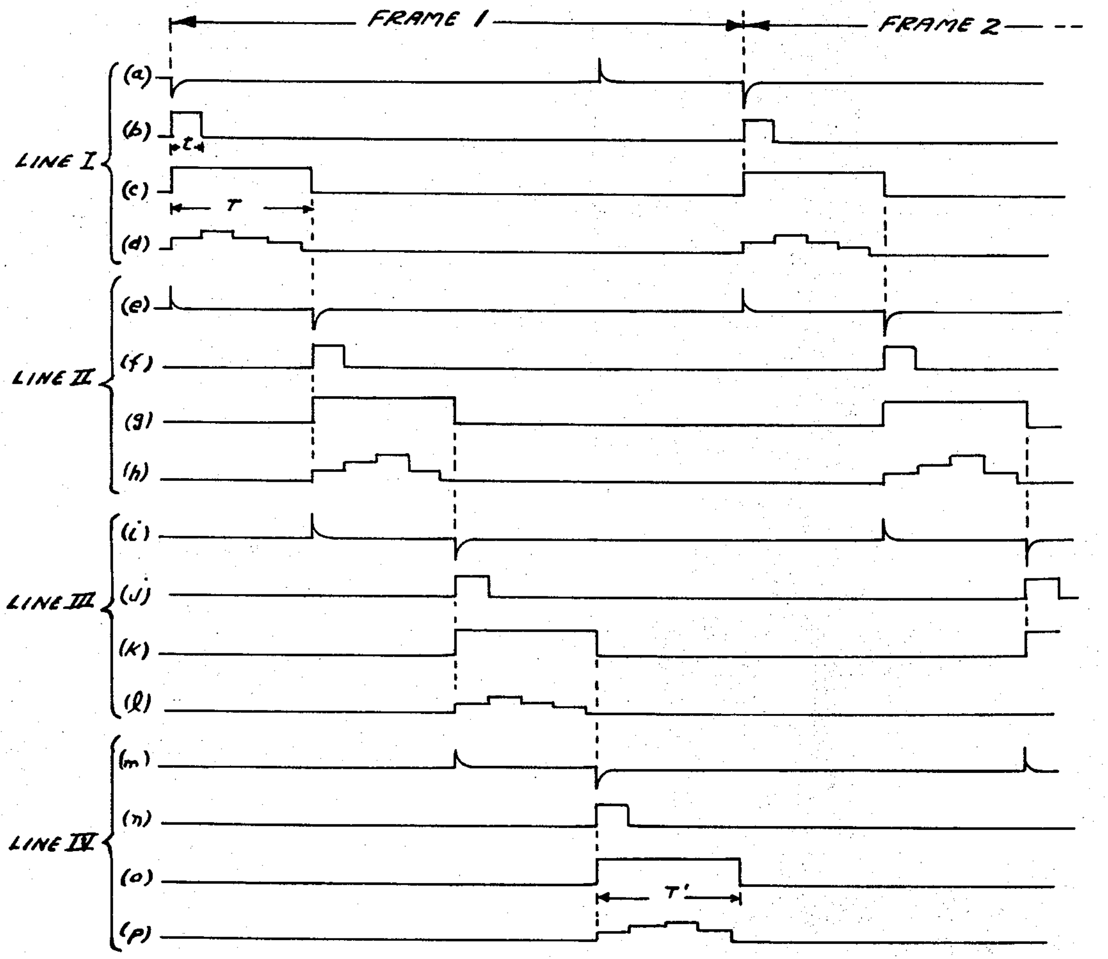
FIG. 3 shows waveforms occurring in FIG. 1.

Line I has associated with it two MMVs (monostable multivibrators) 11 and 12 which are triggered simultaneously by a sharp negative pulse on line 13, this pulse being shown by waveform (*a*) in FIG. 3. MMV 11 generates a pulse of duration *t*, shown by waveform (*b*) of FIG. 3, which is applied over connection 14 to all elements in line I simultaneously. MMV 12 generates on line 15 a pulse of duration T, shown by waveform (*c*), the purpose of which will be explained later. The values of $t$ and T are as follows:

$$t=\frac{F-(L-1)r-R}{N} \quad (1)$$

where:

F=frame time
L=number of horizontal lines
$r$=horizontal retrace time allowed for reproducer
R=vertical retrace time allowed for reproducer
N=total number of mosaic elements.

$$T=nt+r \quad (2)$$

where:

$n$=number of elements per horizontal line.

The simultaneous application of the pulse of duration $t$ over conductor 14 to the photoconductive elements of line I causes currents ot flow through these elements to the video output circuit 16, the value of the current in each case being directly related to the conductance of the element which in turn, as already stated, is directly related to the number of quanta absorbed by the element. The current flow from the first element 10 of line I to the video output circuit is directly through isolating diodes 17 and 18. That from the remaining elements flows in addition through delay lines D1, D2, and D3 having delays of $t$, $2t$ and $3t$, respectively. With this arrangement the currents from the elements of line I flow in sequence to the video output circuit in accordance with a left to right scanning of the line, the video signal for line I being represented by waveform ($d$) in FIG. 3.

The remaining lines of the mosaic have associated MMVs 11 and 12 which are identical in construction and function to those associated with line I, with the exception that MMV 12′ associated with the last line, or line IV, in the example given, produces a somewhat longer pulse than the others by the amount that the vertical retrace time exceeds the horizontal retrace time in the reproducer. The length of the pulse T′ produced by MMV 12′ is, accordingly, $$T'=nt+R \quad (3)$$

In the example shown, the time required to scan one line is $4t$. The pulse produced by MMV 12, as seen from Equation 2, is made longer than $4t$ by the time $r$ allowed as horizontal retrace time for the reproducer. The trailing edge of this pulse is used to trigger the MMVs 11 and 12 of the next succeeding line. For this purpose differentiating circuit 19 derives sharp negative-going pulses from the trailing edge of rectangular wave, as illustrated by waveform ($e$), the MMVs being triggered by the negative-going pulses.

With this arrangement the horizontal lines of the mosaic are scanned in succession from top to bottom producing the video signals illustrated by waveforms ($d$), ($h$), ($l$), and ($p$) which occur in succession in the video output circuit ot form the complete video signal for one frame. After an interval R following the completion of the scanning of the last horizontal line, the trailing edge of the pulse produced by MMV 12′, which has the duration T′ given by Equation 3, triggers MMVs 11 and 12 for line I starting a new frame.

In order to provide horizontal and vertical synchronizing pulses for the reproducer, the negative-going pulses that trigger the MMVs 11 for all the horizontal lines are applied through OR gate 20 to MMV 21 to trigger this MMV at the start of the scanning of each horizontal line. This MMV produces a pulse having a duration exactly equal to the line scanning time $nt$, or $4t$ in the example shown, so that its trailing edge occurs precisely at the end of the line scan. Differentiating circuit 22–23 produces a sharp negative-going pulse from the trailing edge which becomes the horizontal synchronizing pulse. The positive-going pulse due to the leading edge is eliminated by diode 24. The horizontal synchronizing pulse occurring at the end of the scanning of the last line also becomes the vertical synchronizing pulse, being selected by AND gate 25 to which the pulse produced by MMV 12′ is applied as one input.

Operation of the scanning system in FIG. 1 may be started by the application of a negative pulse to line 13, as by the monentary actuation of switch 26. Isolating diodes such as 17 and 27 are normally rendered electrically open by a slight reverse biasing, the anode and cathode voltages being derived from adjustable potentiometers 28 and 29 through resistors such as 30 and 31. The energizing pulses applied to the elements of mosaic by the MMVs 11 overcome this bias. Although the system illustrated in FIG. 1 employs a mosaic of sixteen elements, the scanning system used may be expanded to accommodate a mosaic of any number of elements.

In order to have the output of each mosaic element proportional to the radiation intensity at the element and at the same time achieve maximum sensitivity, the characteristics of the photoconductor and the frame time should be correlated so that the frame time and carrier lifetime of the photoconductor are equal. In this manner a cumulative production of carriers over the entire interval between scans can be achieved.

Figure 4:
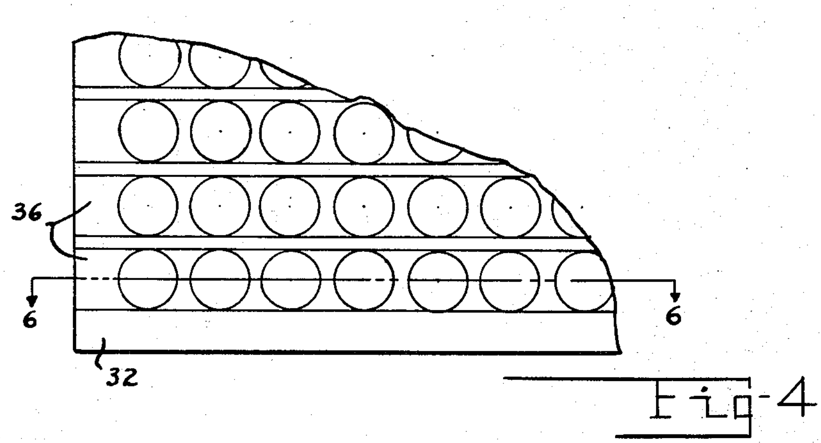
FIGS. 4, 5, and 6 show the construction of the photosensitive mosaic used in the trransducer.
Figure 5:
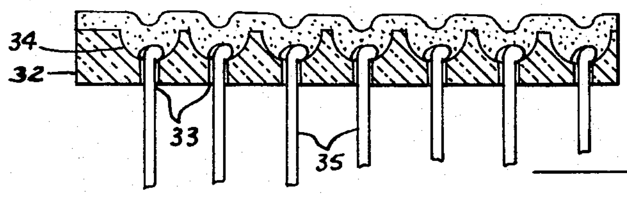
Figure 6:
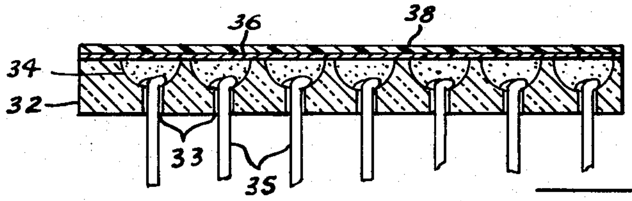

The construction of the mosaic used in the image transducer is illustrated in FIGS. 4, 5, and 6, the mosaic illustrated being one having a larger number of elements than that of FIG. 1. As seen in FIG. 4 and the cross section of FIG. 4 shown in FIG. 6, the mosaic is constructed on a substrate 32 of a suitable insulating material such as glass. Holes 33 are drilled at the center locations of the photoconductive elements over the surface of the substrate. On the image side of the mosaic recesses 34 are formed by countersinking, counterboring or otherwise enlarging the ends of the drilled holes. Wires 35 are then threaded through the holes and their ends bent around to lock them in the recesses. The recesses are then filled with the photoconductive material. One way in which this may be accomplished is by deposition from the vapor phase in an evacuated chamber, as illustrated in FIG. 5, baking for a time and at a temperature appropriate for the photoconductive material used, and grinding off the excess material flush with the surface of the substrate. After this, transparent strips 36 of a conductive material such as aluminum are vacuum deposited over the elements in each line to electrically connect them together. In a modification shown in FIG. 7 suitable for larger elements, this connection may be accomplished by lines of conductive paint 37 contacting the edges of the elements. Finally, the mosaic is coated, as by spraying, evaporating or sputtering, with a light pervious plastic 38 to prevent deterioration of the photoconductor from moisture.

Figure 8:
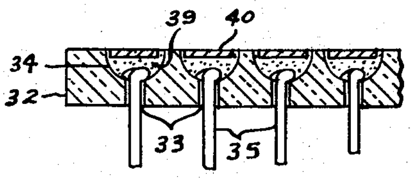
FIG. 8 shows an alternative method of forming the photoconductive elements of the mosaic.

Another method of constructing the mosaic, suitable for larger elements, is illustrated in FIG. 8. In this case the substrate is prepared as before. With wires 35 in place, a small amount of conductive paint 39 is placed in each recess. A small single crystal 40 of a photoconductor is then placed in each recess on top of the conductive paint which serves as an adhesive to retail the crystal in place and as a conductor to connect the crystal to the end of wire 35. The advantage of this method is that the photoconductive elements may be made very uniform in spectral response since the small crystal elements 40 may be obtained from a single larger grown crystal plate.

Figure 7:
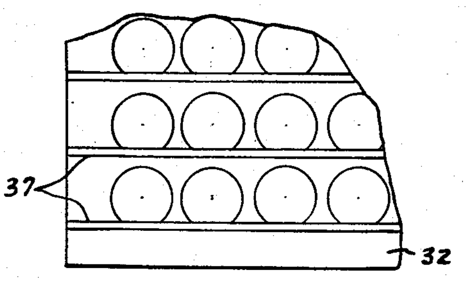
FIG. 7 shows an alternative method of making electrical connection to the mosaic elements on the image side.

In connecting the above-described mosaics to the scanning system of FIG. 1, the strips 36 of FIG. 4, or the strips 37 of FIG. 7, serve as the conductors 14 and the wires 35 serve as the leads 41 connecting the photoconductive elements to the isolating diodes.

What is claimed is:

1. An optical image transducer comprising: a mosaic having discrete photoconductive elements arranged in horizontal lines and vertical columns, said mosaic being constructed of a substrate of insulating material having small holes drilled at the intersections of said lines and columns, having the ends of said holes in one surface of said substrate enlarged to form recesses, having output leads in said holes terminating in said recesses, having a photoconductive element in each recess flush with the substrate surface and in electrical connection with the output lead terminated in the recess, and separate strip conductors on said substrate surface for each horizontal line, the strip conductor for each line being in electrical contact with all of the photoconductive elements in the line; a scanning system for said mosaic for sequentially scanning the horizontal lines of elements in a predetermined frame time which includes allowed horizontal and vertical retrace times for a reproducer, comprising first and second rectangular pulse generators for each horizontal line of said mosaic, each first generator producing a pulse of duration $t$ equal to the difference between the said frame time and the total of the allowed reproducer retrace times per frame divided by the number of mosaic elements, and each second generator producing a pulse of duration T equal to $nt+r$, where $n$ is the number of mosaic elements per horizontal line and $r$ is the allowed horizontal retrace time for the reproducer; means for applying the pulse produced by each first pulse generator to the strip conductor of the associated horizontal line; means for simultaneously triggering the first and second pulse generators for each horizontal line except the first coincidently with the trailing edge of the pulse produced by the second generator for the next preceding line in the scanning sequence; means for simultaneously triggering the first and second generators for the first line of said mosaic coincidently with the trailing edge of the pulse produced by the second generator for the last line of the mosaic; a video output circuit; means including individual isolating diodes for connecting the output leads of the mosaic elements in each column to a common point for that column; means including an additional isolating diode for connecting the common point for each column to said video output circuit; a delay network connected between the common point and the said additional diode for all columns except the first, each network producing a delay equal to $(M+l)t$, where M is the number of columns located between the particular column and the first column; and means for providing a small reverse bias of those isolating diodes connected to the mosaic element output leads.

2. Apparatus as claimed in claim 1 in which means are provided for generating horizontal and vertical synchronizing pulses for a reproducer, comprising: a rectangular delay pulse generator producing a pulse of duration $nt$, where $n$ is the number of mosaic elements in a horizontal line; means for triggering said delay pulse generator coincidentally with the triggering of the said first and second pulse generators for each horizontal line; means for producing horizontal synchronizing pulses that are coincident with the trailing edge of the pulse produced by said delay pulse generator; and means including an AND gate receiving said horizontal synchronizing pulses and the pulse produced by the second pulse generator for the last horizontal line of mosaic elements as inputs for producing a vertical synchronizing pulse at the AND gate output.

3. Apparatus as claimed in claim 1 in which each photoconductive element is in the form of a complete filling of the recess with photoconductive material flush with the substrate surface and in physical contact with the lead wire terminated in the recess.

4. Apparatus as claimed in claim 1 in which each photoconductive element is in the form of a small single crystal platelet derived from a larger single crystal plate of a photoconductive material, said platelet being held in the recess flush with the substrate surface by conductive paint beneath it which acts both as an adhesive and as an electrical connection to the lead wire terminated in the recess.

5. Apparatus as claimed in claim 1 in which each strip conductor consists of a transparent strip of conductive material deposited over and in electrical contact with all of the photoconductive elements in the horizontal line.

6. Apparatus as claimed in claim 1 in which each strip conductor consists of a line of conductive paint in electrical contact with the edges of all of the photoconductive elements in the horizontal line.

7. Apparatus as claimed in claim 1 in which the surface of said mosaic containing the photoconductive elements and strip conductors is covered with a transparent hermetic coating.

8. Apparatus as claimed in claim 1 in which the frame time is made substantially equal to the carrier lifetime of the particular photoconductive material used.

References Cited

UNITED STATES PATENTS 3,317,712 5/1967 Silverman -------- 235—61.11

OTHER REFERENCES

Solid State Infrared Scanner Device, Wetzell, IBM Technical Note, vol. 10, No. 7, December 1967, 178–7.1

A Self-Scanned Solid State Image Sensor, Weimer et al., Proceedings of the IEEE, vol. 55, No. 9, September 1967, 178–7.1, pp. 1591–1602.

RICHARD MURRAY, Primary Examiner

R. L. RICHARDSON, Assistant Examiner

U.S. Cl. X.R.

250—211; 313—108